Patented Aug. 26, 1952

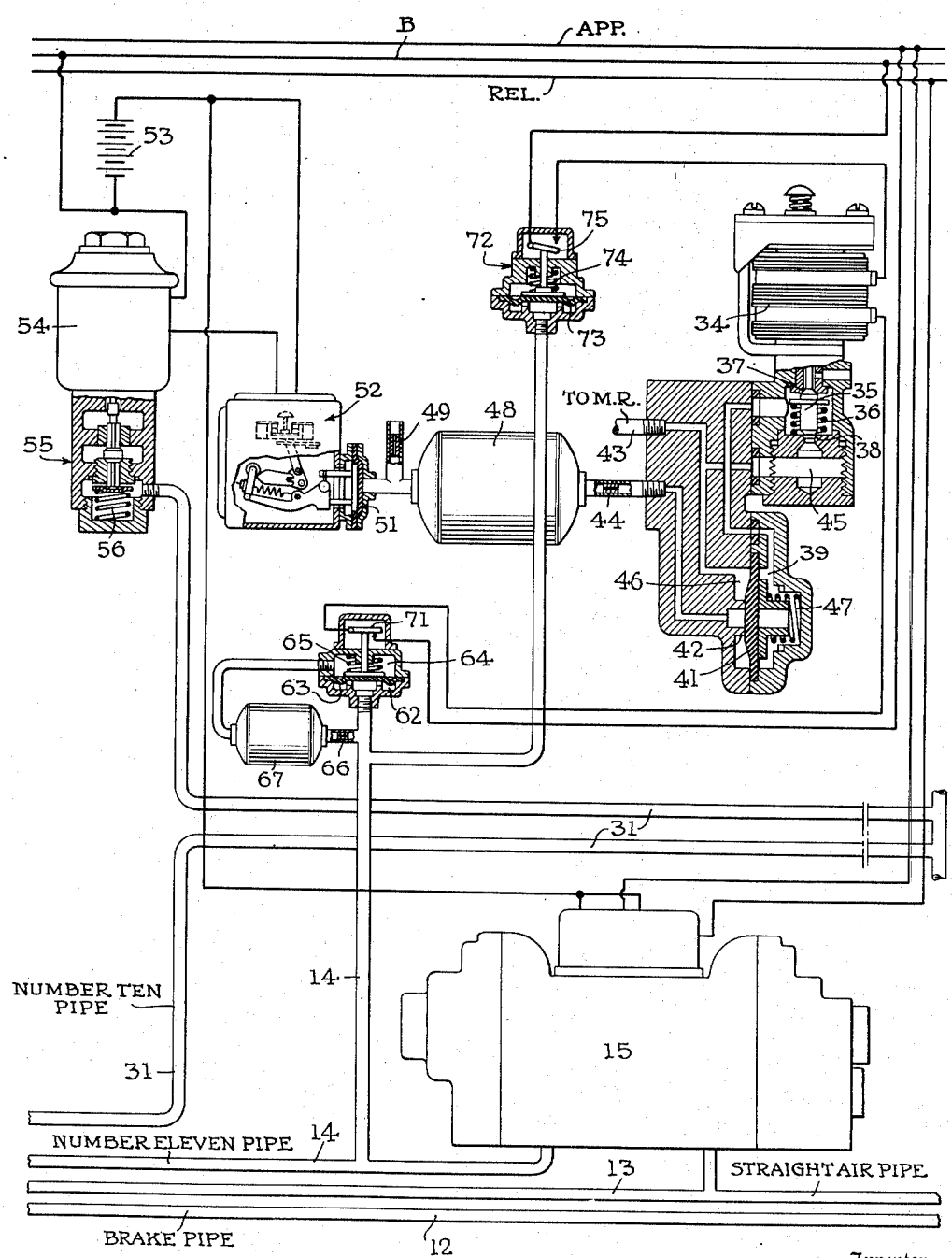

2,608,447

UNITED STATES PATENT OFFICE 2,608,447

AUTOMATIC CUTOUT FOR TRAIN CIRCUIT PROTECTION DEVICE

Martin J. Alger, Jr., Watertown, N. Y., assignor to The New York Air Brake Company, a corporation of New Jersey Application May 17, 1950, Serial No. 162,560

4 Claims. (Cl. 303—26)

This invention relates to air brakes, and particularly to those electro-pneumatic brake systems in which an automatic brake system and an electro-pneumatic straight air brake system are inter-related, and the engineer's brake valve can be set selectively to control on either basis.

The train is normally controlled by manual actuation of the electro-pneumatic straight-air system. The electrical part of such a system must operate on the open-circuit basis, so that electrical failures are not on the side of safety, but continuous availability of automatic emergency and ready availability of the entire automatic system afford a safety factor instantly usable by the engineer so long as his responses are conventional.

Surprise leads to unconventional response in some cases, and as a second safety measure John V. V. Elsworth devised a system which causes a brake application in response to derangement of the electro-pneumatic system sufficient to cause the master controller to cycle. That concept is described and claimed in his allowed application Serial No. 100,928, now Patent No. 2,527,920 issued October 31, 1950.

Rack tests on full size Elsworth apparatus have been in progress to detect undesirable operating characteristics, to discover any situations in which the device might fail to function when it should, or might function when it should not, and whether there are any objectionable "trick manipulations" available to an engineer.

The present invention relates to means for suspending operation of the Elsworth device when the brakes are operated by means other than the engineer's brake valve, for example by a back-up valve at the rear end of the train. Such suspension is desirable because in applications so made the "number eleven pipe" which leads from the engineer's brake valve to the master controller, is not charged, with the result that the Elsworth device would normally tend to cause an automatic brake application even when the electro-pneumatic system is in perfect working order.

The invention attacks the trouble at its source by making the operation of the Elsworth device dependent on the existence of some pressure in the number eleven pipe. A pressure switch is interposed in a controlling part of the Elsworth circuit and is subject to pressure in the number eleven pipe acting in a switch-closing direction.

The invention will now be described by reference to the accompanying drawing in which the single figure is essentially a reproduction of Fig. 4 of the Elsworth application above identified with the present invention added. The showing is to some extent diagrammatic.

General considerations

The engineer's brake valve in the 24-RL brake system includes a so-called service application valve, and the engineer's brake valve is manually convertible for operation selectively on the straight-air principle and on the automatic principle. When set for operation on the automatic principle, the engineer's brake valve applies and releases the brakes by controlling the pressure in the normally charged brake pipe 12. When set to operate on the electro-pneumatic straight-air principle, the engineer's brake valve controls the pressure in a pipe 14 which, in the parlance of the art, is known as the "number eleven pipe." The pressure established in the "number eleven pipe" pilots the operation of the master controller 15 which in turn operates admission and relief magnet valves throughout the train to establish a related pressure in the straight-air pipe and so apply and release the brakes.

The application and release magnet valves are not shown in the drawing of the present application. They are associated in pairs with corresponding control valves, and brake cylinder relay valves not shown in the drawing because they are standard components of systems in daily commercial use.

The magnet valves above mentioned are controlled by the controller 15 through a 3 wire circuit which extends throughout the train and comprises the so-called B wire, the application wire designated by the legend APP, and the release wire designated by the legend REL.

It will be understood that the straight-air pipe and the brake pipe extend throughout the length of the train and are associated with the control valves in the usual manner.

When the brakes are being operated on the straight-air principle and are released, the number eleven pipe 14 is vented. When the engineer's brake valve is manipulated to produce an application it does so by developing a pilot pressure in the number eleven pipe of an intensity dependent on the manipulation of the engineer's brake valve. The pilot pressure so established in the master controller 15 causes the controller to close the release magnet valves and open the application magnet valves which thereupon establish in the straight-air pipe 13 a related pressure.

When this pressure becomes effective in the master controller 15, the controller shifts to a neutral or lap position, in which both the release magnet valves and the application magnet valves are closed. To release the brake, the pressure in the number eleven pipe is reduced, whereupon the master controller 15 opens the release magnet valves but maintains the application magnet valves closed. This vents the straight-air pipe and releases the brakes.

It will be apparent from what has just been said, that if the engineer manipulates the engineer's brake valve to produce a straight-air application, and there is then a break in the straight-air pipe, or a serious leak therefrom, or if one or more release magnet valves fail to function or one or more application magnet valves fail to function, the result will be disturbance of the functioning of the master controller 15.

Most malfunctions short of complete circuit failure (against which the system offers other safeguards), cause the master controller 15 to cycle, a phrase used to designate reciprocation of its switch members; i. e., recurrent operation of the controller. The essence of the Elsworth invention is the use of this recurrent operation or cycling to cause actuation of the service application valve which is already present in the system. Actuation of the application valve causes a full-service application of the brakes on the automatic principle.

The Elsworth device has the great advantage that significant derangements of the straight-air system, but not trivial derangements thereof, cause an automatic full service application of the brakes.

Operation of the application valve is effectuated by venting a pipe known in the art as the "number ten pipe." This pipe is designated by the reference numeral 31 on the drawing. The term "automatic full-service application" is used to mean a brake application of full-service intensity produced on the automatic side of the brake system.

According to the Elsworth invention, as shown in the accompanying drawing, a winding 34 is connected between the line B and the application line so that whenever the master controller 15 functions, the winding 34 is energized. The armature for the winding 34 operates a double beat poppet valve 35, which is biased by a coil compression spring 36 toward an exhaust seat 37 and away from an inlet seat 38. The valve 35 controls the pressure in the chamber 39 behind a combined flexible diaphragm and valve 41.

The combined valve and diaphragm 41 seats against an annular seat 42 and controls flow from a main reservoir connection 43 to a choke 44. Main reservoir pressure from the connection 43 is always present in the space 45 beneath the inlet seat 38 and is also present in the annular space 46 to the left of the diaphragm 41. The combined valve and diaphragm 41 is biased toward its seat by a coil-compression spring 47.

Thus, whenever winding 34 is not energized, diaphragm valve 41 is closed but each time that winding 34 is energized the valve 41 opens, and stays open as long as the winding 34 is energized. It then supplies air through the choke 44 to a small reservoir or accumulator volume 48 which is continuously vented to atmosphere through another choke 49. The sizes of the chokes 44 and 49 are so coordinated that the choke 49 will substantially dissipate pressure in the volume 48 except when winding 34 is energized with a frequency so high as to indicate derangement of the system. When pressure builds up in the volume 48, it reacts on the motor diaphragm 51 of the normally closed pressure switch, generally indicated by the numeral 52.

The source of current for the lines APP, B and REL is typified by the battery 53. The switch 52 is arranged to control a circuit from this battery through the winding 54 of a magnet-valve generally indicated at 55. The valve 55 is biased to open by a coil compression spring 56 and when opened vents the pipe 31. It follows that the winding 54 normally is constantly energized and holds the valve 55 closed. Maintained closure is dependent on integrity of the circuit. The switch 52 is normally closed but will be opened if the volume 48 is sufficiently charged. Thus, excessive cycling of the master controller 15 causes charging of the volume 48; charging of this volume opens the switch 52, and this allows the valve 55 to open and vent the pipe 31.

Venting of the pipe 31 produces an automatic service application which is beyond the control of the engineer, and which warns him that the electro-pneumatic system is seriously deranged. If he cannot discover and quickly correct the defect, all he need do is convert his engineer's brake valve 11 to automatic operation, and proceed on the automatic principle.

As a safeguard against the effect of an initial heavy service application the Elsworth device includes a protective mechanism which is attached to a branch of the "number eleven pipe." The connection from the number eleven pipe 14 leads to the lower chamber 62 of a differential diaphragm mechanism which includes a flexible diaphragm 63 and an upper chamber 64 above the diaphragm.

A biasing spring 65 holds the diaphragm normally in its lower position. A choked connection 66 leads from the number eleven pipe 14 to a small volume chamber 67 which in turn is in free communication with the chamber 64.

From the construction just described it follows that when pipe 14 is initially put under pressure, the diaphragm 63 moves upward and remains upward for a brief period until the volume 67 and space 63 are charged whereupon the spring 65 becomes effective to restore the diaphragm to its lower position and maintain it there. The diaphragm 63, when it moves upward, opens a normally closed switch 71 which is interposed in the circuit which leads from the application wire through the winding 34 to the B wire. By this means energization of winding 34 is delayed for a brief period at the commencement of a heavy brake application. This prevents undesired charging of the reservoir 48.

Once the volume 67 has become charged the protective device becomes inactive, so that it delays only the effect of the initial brake applying rise of pressure in the number eleven pipe. So far the structure is that of the Elsworth invention.

Since the Elsworth device will function when brake applications are made by certain types of back-up valve, the present invention provides means to limit its operation to those times when the brakes are being controlled through the engineer's brake valve, which of course is the normal and usual condition.

The result is secured by subjecting a pressure switch, generally indicated by the reference numeral 72, to pressure in the number eleven pipe 14. This pressure switch is connected in series with the switch 71 and is so arranged that the switch 72 is open until at least a moderate pressure is developed in the number eleven pipe 14.

The switch 72 as diagrammed comprises a flexible diaphragm 73 subject on its lower face to pressure in the pipe 14. It is biased downward by a coil compression spring 74 and includes a switch arm 75 which closes its circuit only when the diaphragm 73 is forced upward against the resistance of spring 74. Since the switch mechanism 72 is so contrived as to close as soon as any significant pressure is developed in the pipe 14, it has no effect except to limit operation of the Elsworth mechanism to periods when the "number eleven pipe" is subject to at least moderate pressure.

While the utility of the invention has chiefly to do with back-up valve operation the possibility of other uses is within contemplation.

I claim:

1. In an air brake system the combination of a master controller having a pilot pressure connection, a straight-air pressure connection and switch means arranged to be actuated as the controller shifts reversely in response to the predominance of pressure in one or the other of said connections; a reservoir having a bleed port; electrically actuated means controlled by said switch means and arranged to supply compressed air to said reservoir in successive increments corresponding to successive actuations of the master controller so that the rate of supply of air to the reservoir will increase with increasing frequency of shift of the controller; brake applying means adapted to be rendered active by attainment of a predetermined pressure in said reservoir; and switch means also controlling said electrically actuated means and itself subject to pressure in said pilot pressure connection.

2. The combination of an electro-pneumatic brake system including a regulatory pressure connection, a straight-air pipe and a master controller which is subject in opposing directions to pressure in said connection and pressure in said pipe; safety means for applying the brakes; energy storing means including means to dissipate the stored energy at a limited rate; means operable in response to successive operations of said master controller and serving to deliver energy in corresponding successive increments to said storing means so that the rate of delivery of energy will increase with the frequency of such operation; means responsive to accumulation of energy in said storing means above a predetermined value and serving to put said safety means into action; and means effective when said regulatory pressure connection is substantially free of pressure to inhibit the operation of said energy delivery means regardless of the action of said master controller.

3. The combination defined in claim 2 in which the energy delivering means is electrically controlled and the means effective when the regulatory connection is substantially free of pressure is a pressure switch biased to open, controlling said delivery means and subject in a switch closing direction to pressure in said pilot connection.

4. The combination in claim 2 in which the energy storing means comprises a reservoir with restricted vent; the means responsive to accumulation of energy responds to excess pressure in said reservoir; the energy delivering means is an electrically controlled valve regulating delivery of compressed air to said reservoir; and the means effective when the regulatory connection is substantially free of pressure is a pressure-switch interposed in the control circuit of the electrically controlled valve and subject to pressure in said pilot connection.

MARTIN J. ALGER, Jr.

REFERENCES CITED

The following references are of record in the file of this patent:

UNITED STATES PATENTS

| Number | Name | Date |
| --- | --- | --- |
| 2,121,543 | Hewitt | June 21, 1938 |
| 2,527,920 | Elsworth | Oct. 31, 1950 |